United States Patent [19]

Gavin

[11] Patent Number: 5,655,564
[45] Date of Patent: Aug. 12, 1997

[54] SEPTIC SYSTEM PLASTIC DISTRIBUTION BOX WITH INTEGRALLY FASTENED SEAL

[76] Inventor: Norman W. Gavin, 2545 Ridge Rd., North Haven, Conn. 06473

[21] Appl. No.: 434,604

[22] Filed: May 4, 1995

Related U.S. Application Data

[63] Continuation-in-part of Ser. No. 389,874, Feb. 17, 1995, Pat. No. 5,538,035.

[51] Int. Cl.⁶ ............................................. F16L 5/00
[52] U.S. Cl. .............................. 137/363; 52/20; 52/21
[58] Field of Search ...................... 137/363; 52/20, 52/21

[56] References Cited

U.S. PATENT DOCUMENTS

| | | | |
|---|---|---|---|
| 3,714,961 | 2/1973 | Davidson et al. | 137/363 |
| 3,850,457 | 11/1974 | Bigotte et al. | 137/363 |
| 3,938,285 | 2/1976 | Gilbu | 52/20 |
| 4,089,139 | 5/1978 | Moffa et al. | 52/20 |
| 4,128,107 | 12/1978 | Blumhardt | 137/318 |
| 4,275,757 | 6/1981 | Singer | 137/363 |
| 4,440,406 | 4/1984 | Ericson | 277/207 |
| 4,663,036 | 5/1987 | Strobl, Jr. et al. | 210/170 |
| 4,732,397 | 3/1988 | Gavin | 277/207 |
| 4,805,920 | 2/1989 | Gavin | 277/207 |
| 5,286,040 | 2/1994 | Gavin | 277/207 |
| 5,361,799 | 11/1994 | Chilton et al. | 137/363 |

*Primary Examiner*—A. Michael Chambers
*Attorney, Agent, or Firm*—Robert A. Seemann

[57] ABSTRACT

A plastic fluid distribution box for installation in a subterranean system for waste water transport includes a first wall having an opening in the wall, and an elastomeric seal mounted in the opening and including a second wall. The second wall is permanently and sealingly attached to the first wall adjacent to and around the opening. The elastomeric seal includes a third planar wall having an annular separation ring defining a second opening dimensioned to provide a watertight fit on a pipe of predetermined dimension. Walls connecting the third planar wall to the second wall are angled with respect to the planar wall by an angle selected from the group of angles consisting of generally 90 degrees and generally 180 degrees.

2 Claims, 13 Drawing Sheets

SEPTIC SYSTEM PLASTIC DISTRIBUTION BOX WITH INTEGRALLY FASTENED SEAL

This application is a continuation-in-part of U.S patent application Ser. No. 08/389,874, filed Feb. 17, 1995, now U.S. Pat. No. 5,538,035, issued Jul. 23, 1996.

BACKGROUND OF THE INVENTION

1. Field of the Invention

This invention relates to fluid handling, more specifically to a subterranean, plastic, box for fluid distribution, such as is used in septic tank systems and geographical drainage, which has seals for receiving and sealing around subterranean pipes.

2. Description of the Prior Art

It is important to maintain a secure and watertight seal at a first stage between a fluid distribution box and the seal means at an opening through the box wall, and at a second stage between the seal means and the pipe which is connected to the box by entering through the seal means.

The strength and watertightness of each of the two stages is attacked by physical impact against the pipe and seal from backloading of soil into the trench in which the box and pipes are buried, and by heaving and settling of soil around the wall openings and the pipes during the 10, 15, or more years that the subterranean distribution system must last.

Installers and manufacturers are well aware of the above problem of providing a long time and secure seal between an underground box and the pipe with which it is connected. Many inventions which attempt to solve the problem for concrete and for plastic boxes have been patented.

Concrete boxes have thick walls and a high weight to volume ratio. They are seldom subjected to upward floating movement from soil water displaced by the box during rises in the water table, and tend to be stable if properly bedded. Effective two stage seals have been developed for the concrete box and have been contributing a solution to the problem for many years.

Although a solution for the described seal problems in concrete boxes has been sold and in public use for many years, a good solution for the more severe seal problem in plastic boxes is still needed.

A septic system concrete septic tank and distribution box, for example, U.S. Pat. No. 5,286,040, patented Feb. 15, 1994 by Norman Gavin describes an elastomeric seal which includes, at the first stage, an integral annular flange on the cylindrical outer body portion of the seal. The flange extends generally radially outwardly and is adapted to be embedded in the cast cementitious material about an opening through a wall of a concrete distribution box during casting of the box to secure the seal in position in the opening. The cement surrounds the flange and cylindrical outer body for substantially the full axial length of the body, forming a watertight seal between the wall and the body.

At the second stage, the elastomeric seal has a frustoconical wiper blade which has a knock out web at its smaller diameter end portion. The knock out web includes two weakened narrow annular portions of different sizes, on different centers.

U.S. Pat. No. 4,805,920, patented Feb. 21, 1989, and U.S. Pat. No. 4,732,397, patented Mar. 22, 1988, by Norman Gavin also describe a frustoconical seal which includes an integral annular flange that extends generally radially outwardly and is adapted to be embedded in the cast cementitious material about the opening through the wall of the concrete box during casting of the box.

Plastic boxes have relatively thin walls. They are more likely to be dislodged by changes in the water table and shifts in soil.

U.S. Pat. No. 4,663,036 patented May 5, 1987 by Strobl, Jr. et al., describes a generally flexible seal for an opening through the wall of a plastic distribution box.

The seal includes a cylindrical outer wall having a pair of annular flanges which extend generally radially outwardly and are adapted to clamp between them, the box wall immediately forming the opening. The flanges are inclined slightly toward one another, and the cylindrical wall between them includes an annular radially outwardly extending bead. The pair of annular flanges clamp and sealingly engage the box side wall adjacent to the opening, and the bead contacts the inward edge of the wall surrounding the opening when the seal is snap-fitted into the opening.

A frustoconical shaped wiper blade member which extends inwardly from one end of the cylindrical outer wall forms a pipe-receiving opening of predetermined size through the blade member. The blade member engages and seals against a pipe that is suitably sized to fit the opening through the blade member when the pipe is inserted through the pipe-receiving opening of the wiper blade member.

The inclining of the flanges slightly toward one another contributes to sealing between the seal body and the wall of the box when the inserted pipe rotates slightly out of axial alignment with the axis of the cylindrical outer wall.

An excessive angle with respect to the axis of the cylindrical wall, of a pipe inserted through the pipe-receiving opening, can cause the snap-fitted seal member to pop out of the box wall opening. Soil hydraulic and shifting forces also can have a deleterious effect upon the long time reliability and quality of the two stages of sealing.

A twist-in seal for a plastic distribution box is made by American Manufacturing Co. Inc., Manassas, Va. The seal 20, shown in FIGS. 1–4, labeled PRIOR ART, has a pair of annular flanges 24 and 28 which extend generally radially outwardly and are adapted to clamp between them, wall 32 of a plastic distribution box, immediately where it forms opening 36. Flange 24 is continuous, flexible and inclined toward flange 28 so that surface 38 sealingly contacts wall 32 when wall 32 is clamped between flanges 24 and 28. Flange 28 formes a plurality of lugs 44 which have inclined lead faces Seal 20 is installed in the box wall 32 opening 36 which has radially inwardly extending portions 54 by orienting seal 20 so that lugs 44 clear portions 54 when flange 28 is inserted through opening 36, then rotating seal 20 so that lead faces 46 engage portions 54 and draw surface 38 of flange 24 sealingly against wall 32.

Figure 1:
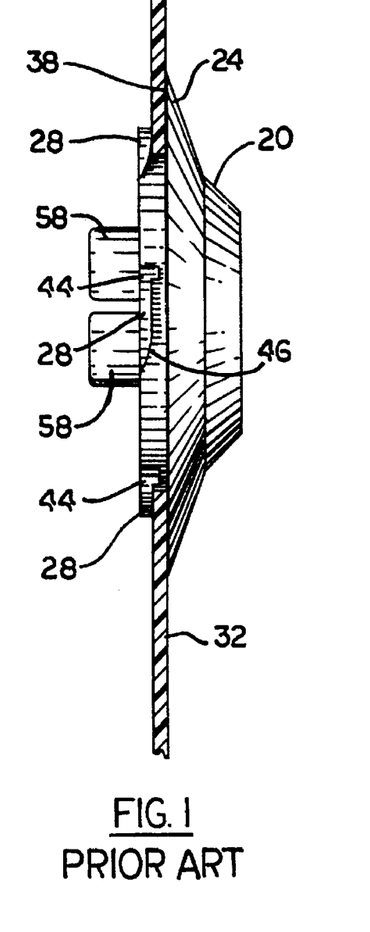
FIG. 1 is a side view of a prior art seal.
Figure 2:
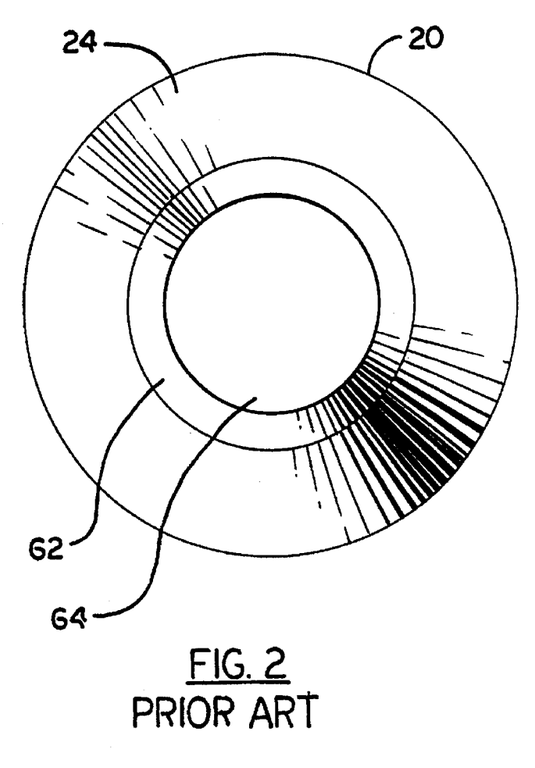
FIG. 2 is a front view of the prior art seal of FIG. 1.
Figure 3:
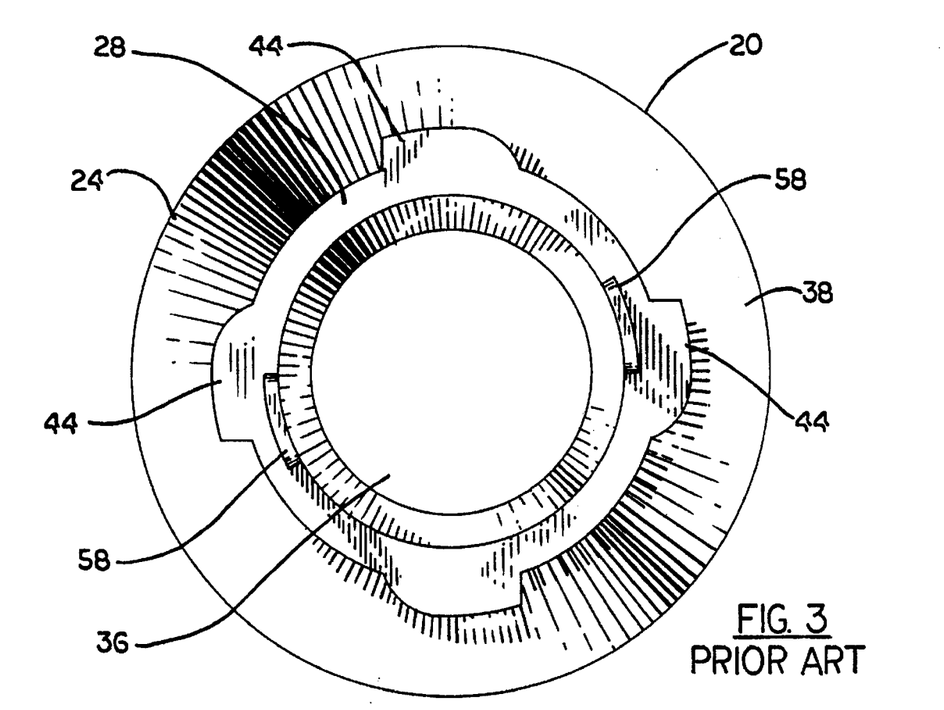
FIG. 3 is a rear view of the prior art seal of FIG. 1.
Figure 4:
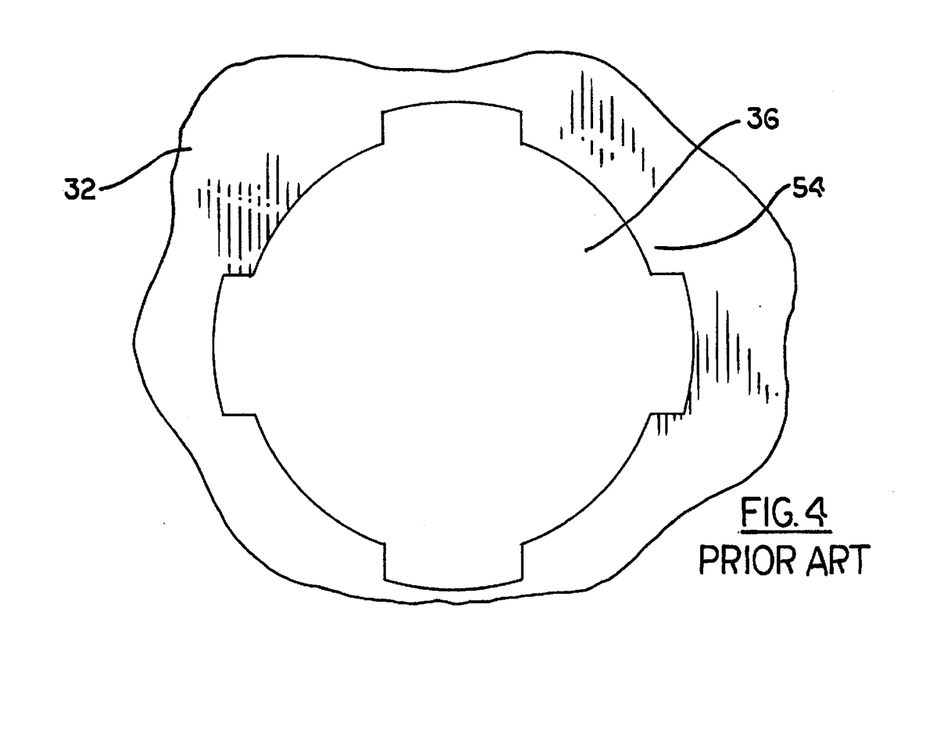
FIG. 4 is a front view of a plastic distribution box wall opening configured for receiving the prior art seal of FIG. 1.

Axially extending grip bars 58 are provided for use by an installer to aid in twisting the seal in place against the counterrotational friction between the flanges and the wall.

Frustoconical flexible seal wall 62 forms opening 64 for receiving a pipe of proper diameter so that wall 62 seals against the outer surface of the pipe. The installer must take care not to rotate the pipe after installation, as there is a chance that the pipe may rotate the seal toward an unlocking position or to one of reduced sealing force between flange 24 and wall 32.

Figure 5:
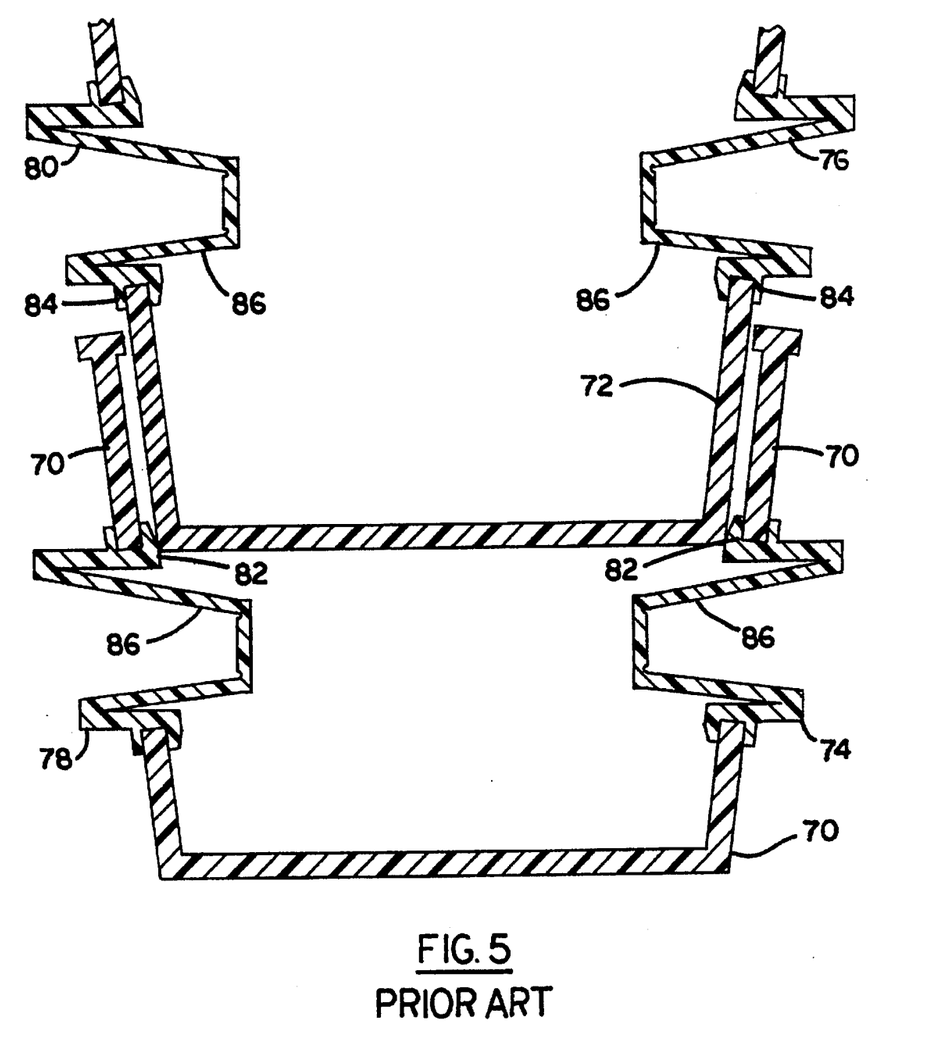
FIG. 5 is a schematic view of prior art nested fluid distribution boxes with installed seals.

U.S. Pat. No. 5,361,799, patented Nov. 8, 1994 by Chilton et al, describes a subterranean, plastic, preformed waste water access fitting comprising a hollow body that has a vertical extension and two horizontal extensions. The vertical extension is sealed over at the top, and can be cut off at the top in order to obtain access to the inside of the body for maintenance or to insert a standpipe. Each of the horizontal extensions are formed of connected segments of decreasing outer diameter with a cutting guide on each segment. The segments can be cut to mate with various diameters of pipe. Referring to FIG. 5, PRIOR ART plastic distribution boxes 70 and 72 have clamped-in seals 74, 76, 78 and 80. Box 72 rests on box 70, but can not be shipped fully nested in box 70 when the seals are installed in the boxes because clamp rims 82 and 84, and frustoconical wiper blades 86 interfere with full seating of one box in the other. It is not practical, therefore, to ship the boxes with the seals installed. The seals and boxes may be shipped separately and, the seals installed in the boxes at the construction site. An inventory of different size seals may be shipped in order to be able to install a seal that will fit one of a predetermined variety of smooth and corrugated pipes of different diameter.

SUMMARY OF THE INVENTION

Plastic fluid distribution boxes of the present invention mean septic tanks, distribution boxes such as are connected to septic tanks, below ground waste water catch basins, and similar liquid containers which receive and pass on the liquid to pipes by way of low pressure seals, in which the containers are made predominantly of plastic containing materials such as plastic, filled plastic, and fiberglass reinforced plastic. Elastomeric seals of the present invention include rubber, plastic and other material which flexes sufficiently to make the low pressure seal around the pipe.

It is one object of the present invention to provide a plastic distribution box with an elastomeric seal in which the first stage of seal between the seal body and the box is leaktight and the seal cannot be dislodged from the box by dint of force from the surrounding soil or twist of pipe, and which provides at the second stage of seal, superior sealing between the seal body and the pipe.

It is another object that the seal body be integrally and permanently fastened to the distribution box.

It is another object that the seal is integrally and permanently sealed to the distribution box around the box wall opening which contains the seal.

It is another object that the seal body be integrally and permanently bonded to the distribution box around the box wall opening which contains the seal.

It is another object that the integral and permanent bond between the distribution box and the seal body consists of material of the distribution box at the interface of the box and seal, and material of the seal body at the interface.

It is another object that the bond between the distribution box and the seal body be a fusion bond of material of the seal body and material of the distribution box.

It is another object that the bond between the distribution box and the seal body be a fusion of the material of the seal body and material of the distribution box, and that the remaining portion of the seal body and box adjacent to the interface be essentially as-molded.

It is another object that the bond between the distribution box and the seal body extends substantially over the full axial contact interface between the seal body and the distribution box, and that the remaining portion of the seal body and box adjacent to the interface be essentially as-molded.

It is another object that the bond between the distribution box and the seal body be a friction fusion bond.

It is another object that the bond between the distribution box and the seal body be a chemically induced fusion bond of the box and seal body materials.

It is another object that the bond between the distribution box and the seal body be by chemical means.

It is another object that the second stage seal be substantially watertight with the pipe.

It is another object that the second stage seal comprises a firm frictional engagement and effective seal between the exterior peripheral surface of the pipe and the seal body.

It is another object that the seal between seal body and the exterior peripheral surface of the pipe be a low pressure seal effective for a septic waste flow system.

It is another object that the second stage seal comprises a planar wall having an opening therethrough for receiving the pipe through the planar wall.

It is another object that the second stage seal comprises a firm frictional engagement and effective seal between the exterior peripheral surface of the pipe and the planar wall.

It is another object that the planar wall opening be adjustable to accept any one of a predetermined variety of pipe diameters and pipe configurations between straight and corrugated.

It is another object that the substantially watertight second seal be maintained across a range of pipe entrance angles to the planar wall.

It is another object that the second stage seal has minimal radial deflection when encountering asymmetrical radial force from a pipe.

It is another object that the second stage seal wall transfers radial force from the pipe in a plane which includes the rim of the wall opening which receives the seal.

It is another object that two distribution boxes containing a seal in each be nestable with the seal of one box behind the seal of the other box.

It is another object that the distribution box with permanently bonded seal can be shipped compactly nested, and ready to receive at the construction site, any one of a predetermined variety of different diameter, smooth and corrugated pipes.

Other objects and advantages will become apparent to one reading the following description of the invention.

A plastic fluid distribution box that is adapted for installation in a subterranean system for waste water transport includes a first wall having an opening in the wall, and an elastomeric seal mounted in the opening and comprising a second wall. The second wall is permanently and sealingly attached to the first wall adjacent to and around the opening. The elastomeric seal comprises a third planar wall connected to the second wall and comprising a first annular separation ring defining a second opening. The dimension of the second opening is such that it makes a substantially watertight fit on a predetermined size pipe when the predetermined size pipe is in the second opening.

BRIEF DESCRIPTION OF THE DRAWINGS

In order that the invention be more fully comprehended, it will now be described, by way of example, with reference to the accompanying drawings, in which:

FIGS. 1–6 are of Prior Art. FIGS. 7–27 are of the present invention.

DESCRIPTION OF THE PREFERRED EMBODIMENTS

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Figure 6:
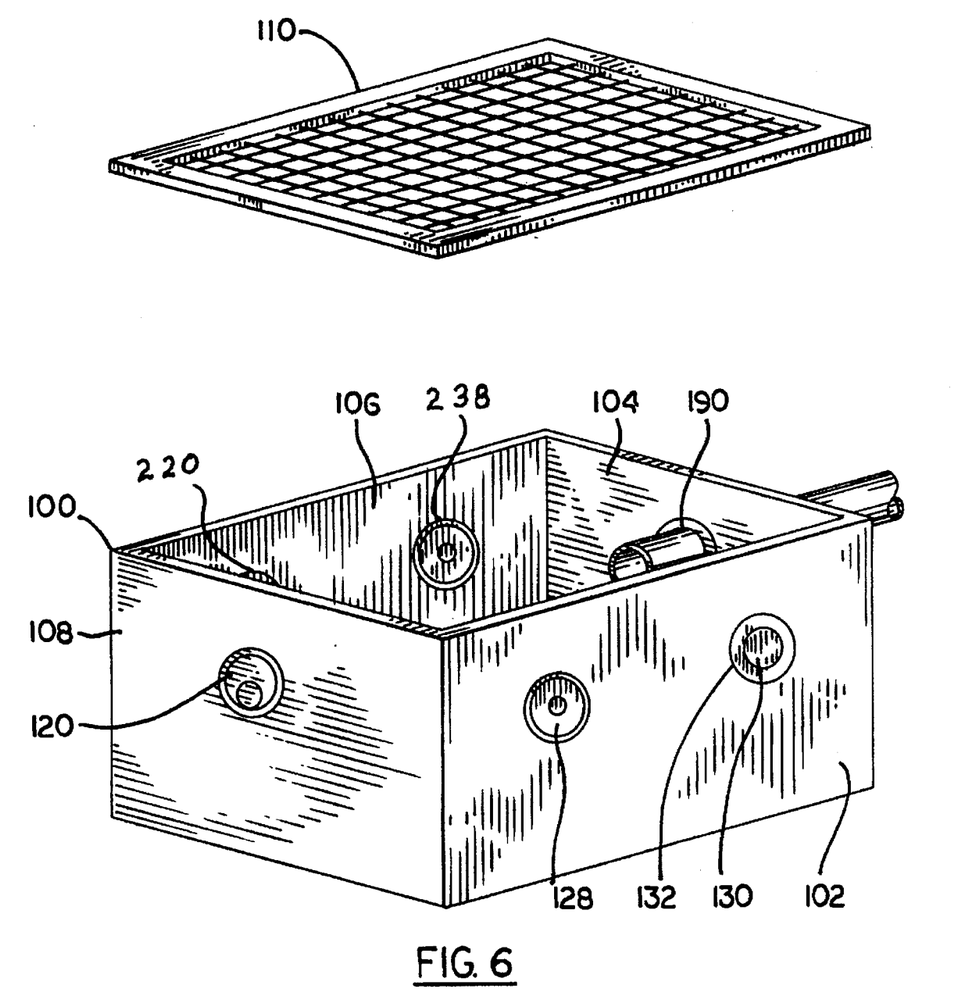
FIG. 6 is a perspective view of a plastic fluid distribution box with integrally molded seals, of the present invention.

Plastic distribution box 100 shown in FIG. 6 with drain grate cover 110, includes several different seals for receiving pipes through walls 102, 104, 106, and 108. Included therein are frustoconical seals of the type described and patented in U.S. Pat. Nos. 4,732,397, 4,805,920, and U.S. Pat. No. 5,286,040. U.S. Pat. Nos. 4,732,397, 4,805,920, and U.S. Pat. No. 5,286,040 are hereby incorporated by reference.

Seal 120 has an asymmetrical pipe seal design which can be adjusted to receive and provide a seal around any one of a number of diameter pipes without having to significantly change the height of the pipe trench bed which supports the pipe at the height that is suitable for the pipe to be received in the seal. Seal 120 is described in U.S. Pat. No. 5,286,040.

Seal 128 can be adjusted to sealingly fit various diameter pipes. Regardless of the diameter of the pipe, it is supported by the seal on a common axis. Seal 128 is described in U.S. Pat. No. 4,805,920.

Figure 7:
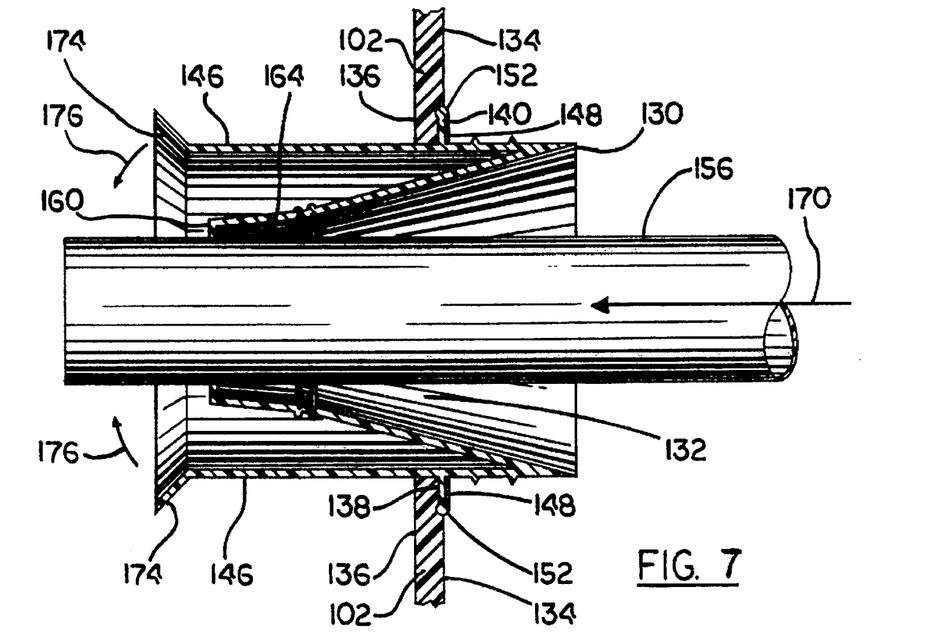
FIG. 7 is a vertical cross section view of a portion of the box of FIG. 6, with a pipe through a seal.

Seal 130, is described in U.S. Pat. No. 4,732,397. Referring to FIG. 7, the seal is mounted in wall opening. 132 permanently integrally fastened to wall 102. A continuous watertight seal exists between outer side 134 of wall 102 and backside 138 of annular flange 140 which extends generally radially outwardly from cylindrical outer wall 146 of seal 130.

Fastening is preferably by means which provide a substantially continuous annular bond between flange 140 and wall 102, such as a fusion or weld bond between backside 138 and outer side 134.

The bond is preferably made by ultrasonic welding, or otherwise heating the plastic of wall 102 and of seal 130. A chemical bonding agent may also be used to provide the continuous annular bond, such as by partially dissolving the flange and wall at their interfaces to fuse them together, or by gluing them together with a glue which adheres strongly to the wall and the flange.

The bond provides resistance to soil hydraulic forces and pipe twisting forces that prevents seal 130 from being dislodged by the forces, and establishes a permanent watertight seal between the wall and seal 130. Greater resistance to detrimental shear forces is provided by rim 152 fastened to and extending axially onto the outer side of wall 102. A secure water resistant seal between seal 130 and pipe 156 is provided by annular sealing edge 160 of frustoconical sealing skirt 164.

A plurality of mechanical fasteners such as rivets may also be used to fasten the seal to the wall so as to provide the continuous annular bond between the seal and the wall. Heat or chemical fastening, however, is preferred because of lower overall cost and more uniform sealing.

In this arrangement in which flange 140 is fastened to the wall at the outer side of the wall, seal 130 is passed through opening 132 in wall 102 from the front side of the wall in the direction of arrow 170, before fastening it to the wall. Bell flange 174 is sufficiently flexible so that the bell flange can be folded radially inward in the direction of arrows 176, to provide clearance between flange 174 and wall 102 so that seal 130 can be inserted through opening 132.

Figure 8:
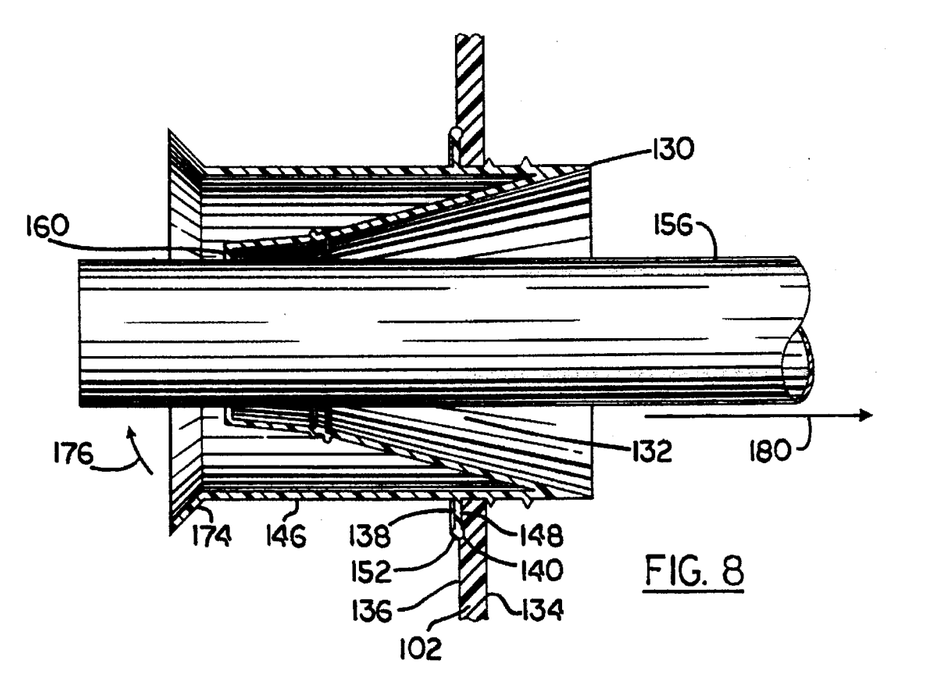
FIG. 8 is a vertical cross section view of a portion of the box of FIG. 6, with a pipe through another seal.

FIG. 8 shows flange 140 fastened to wall 102 with front side 148 of the flange fastened to inner side 136 of the wall. In this arrangement, frustoconical seal 130 is passed through wall 102 from inner side 136 as shown by direction arrow 180, before fastening it to the wall.

Figure 9:
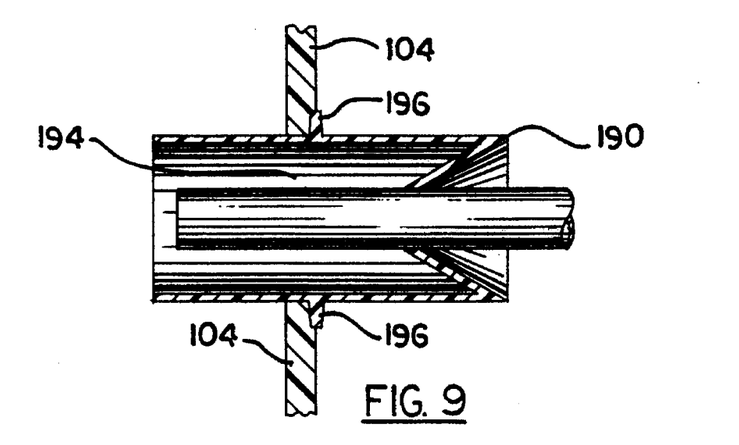
FIG. 9 is a vertical cross section view of a portion of the box of FIG. 6, with a pipe through another seal.

In FIG. 9, frustoconical seal 190 is permanently, sealingly fastened in wall 104. Installation in opening 194 through wall 104 from either direction depending upon which side of the wall one plans to fasten continuous annular flange 196 is more convenient in the absence of a bell flange, as the seal can be installed without having to deform a bell.

Figure 10:
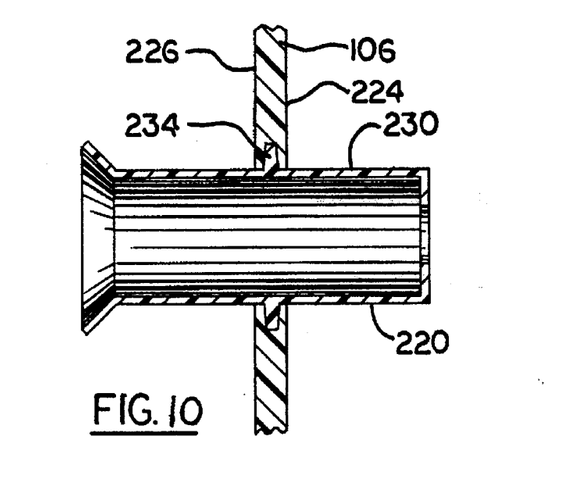
FIG. 10 is a vertical cross section view of a portion of the box of FIG. 6, with another seal.

In FIG. 10, frustoconical seal 220 is permanently, sealingly fastened in wall 106. Although the body of the seal extends axially beyond the front side 224 and the back side 226 of wall 106, flange 234 is substantially enclosed within wall 106. This can be accomplished by remelting the wall plastic to enclose the flange. If desired, flange 234 can be eliminated and wall 106 can be permanently, sealingly, fastened directly to outer cylindrical wall 230 of seal 220.

Figure 11:
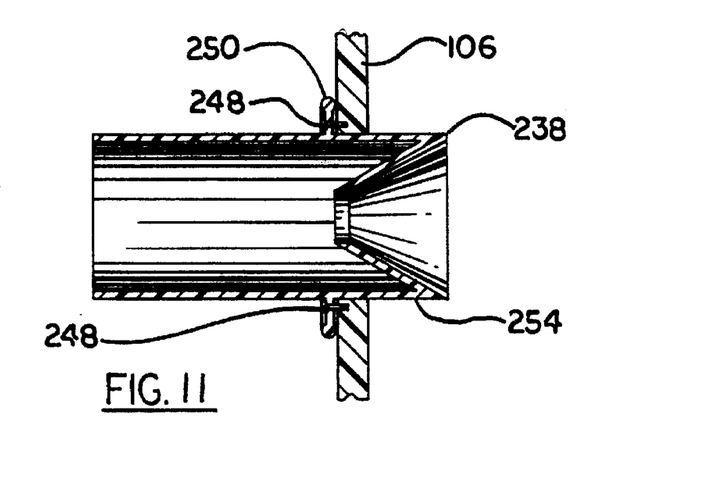
FIG. 11 is a vertical cross section view of a portion of the box of FIG. 6, with another seal.

In FIG. 11, frustoconical seal 238 is permanently fastened to wall 106 by a plurality of rivets 248. Permanent watertight seal is provided by the engagement of annular flange 250 with wall 106. Further seal is provided by a chemical bonding agent for plastics between outer wall 254 of the seal and wall 106.

Figure 12:
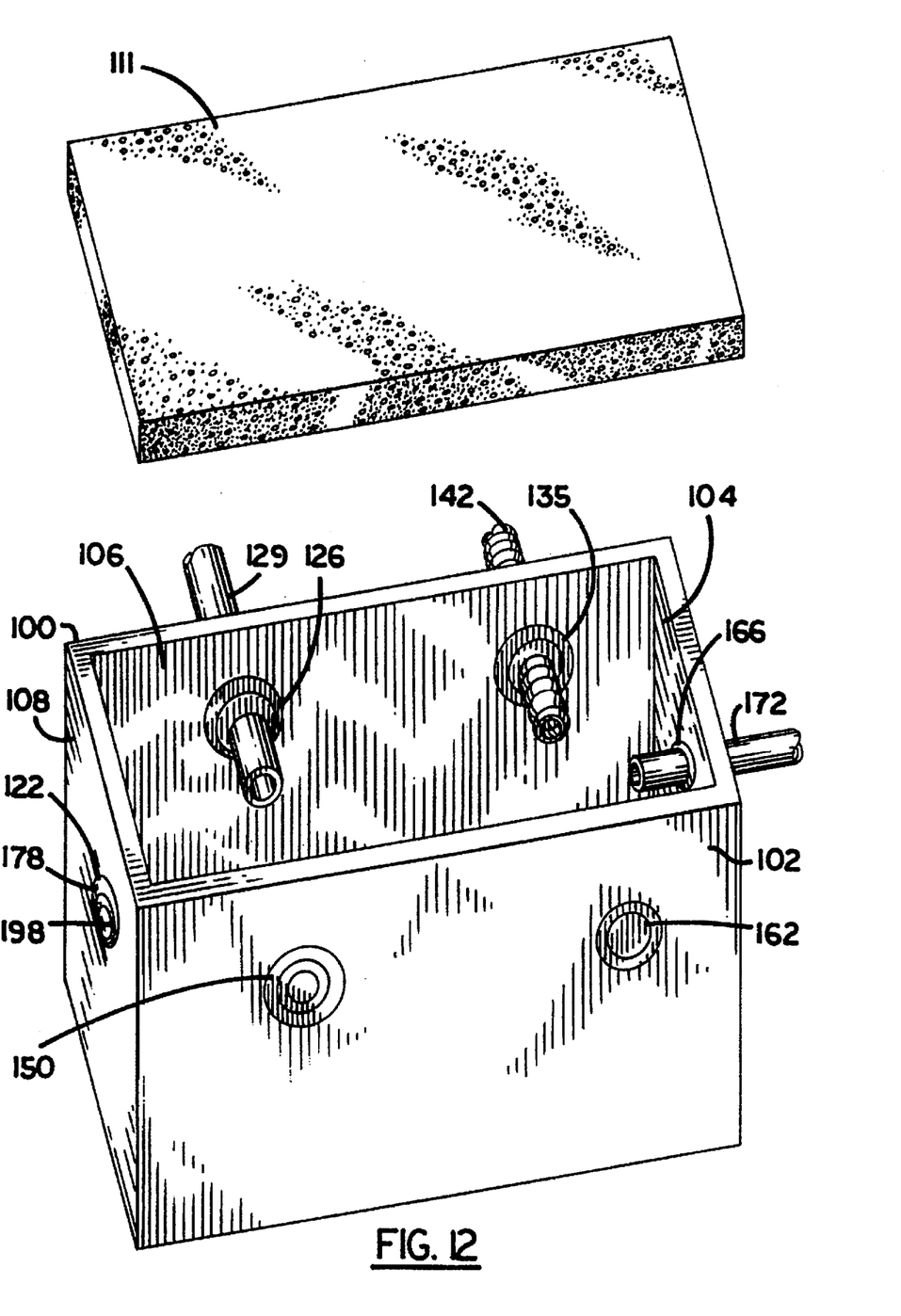
FIG. 12 is a perspective view of another plastic fluid distribution box with integrally molded seals, of the present invention.

Plastic distribution box 100 for an underground septic system, shown in FIG. 12 with concrete cover 111, includes several different seals for receiving pipes through walls 102, 104, 106, and 108.

Seals 178 and 126 have an asymmetrical pipe seal design which can be adjusted to receive and provide a seal around any one of a number of diameter pipes without having to significantly change the height of the pipe trench bed which supports the pipe at the height that is suitable for the pipe to be received in the seal. Seal 126 contains straight wall pipe 129.

Seals 135 and 150 are symmetrical pipe seals. They can be adjusted to sealingly fit various diameter pipes. Regardless of the diameter of the pipe, it is supported by the seal on a common axis. Seal 135 contains corrugated pipe 142. Seals 162 and 166 each provide a seal opening for a predetermined size pipe. Seal 166 contains pipe 172.

Referring to FIGS. 12, 13, 14, and 15, seal 178 is mounted in wall 108 opening 122, and integrally and permanently fastened to wall 108. A continuous annular watertight seal between outer side 124 of wall 108 and backside 184 of annular flange 186 which extends generally radially outwardly from outer end 188 of cylindrical outer wall 193 of seal 178.

Figure 13:
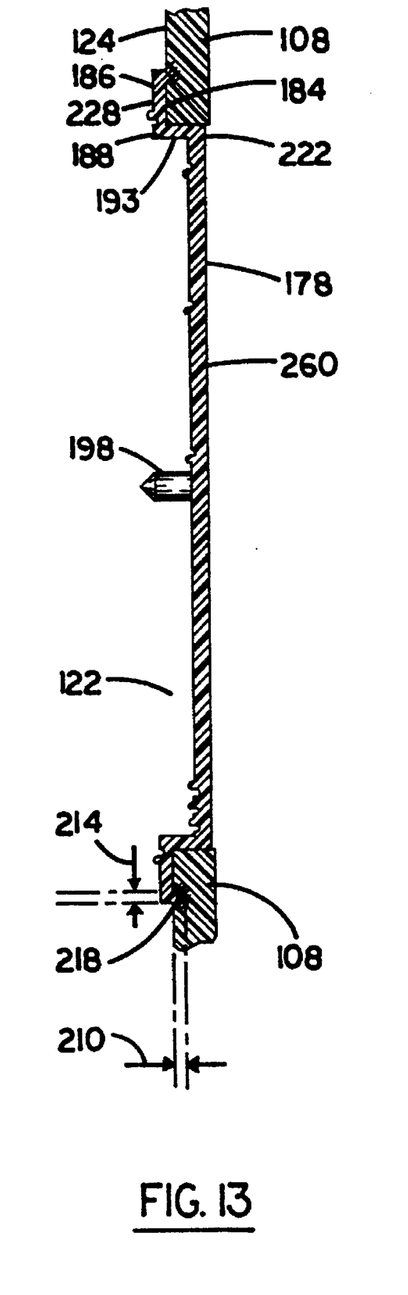
FIG. 13 is a cross section view of a seal installed in a box wall.
Figure 14:
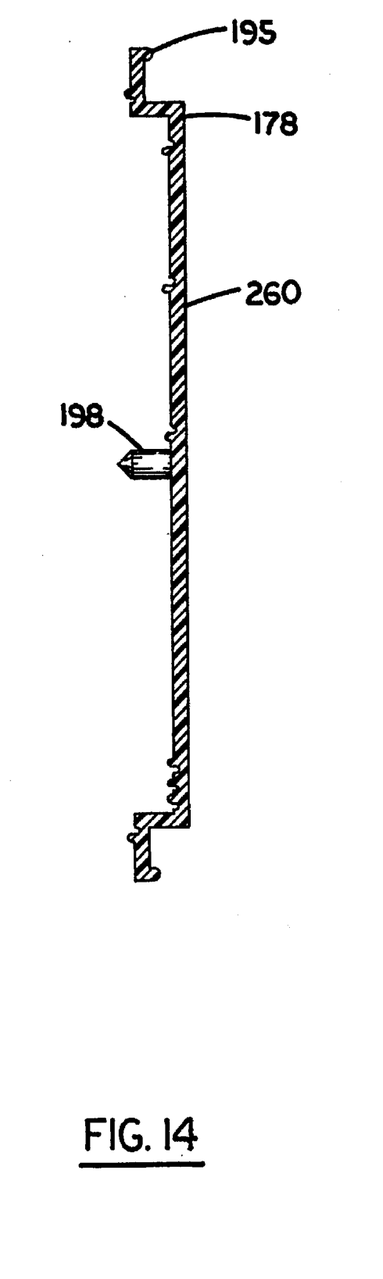
FIG. 14 is a cross section view of a seal.
Figure 15:
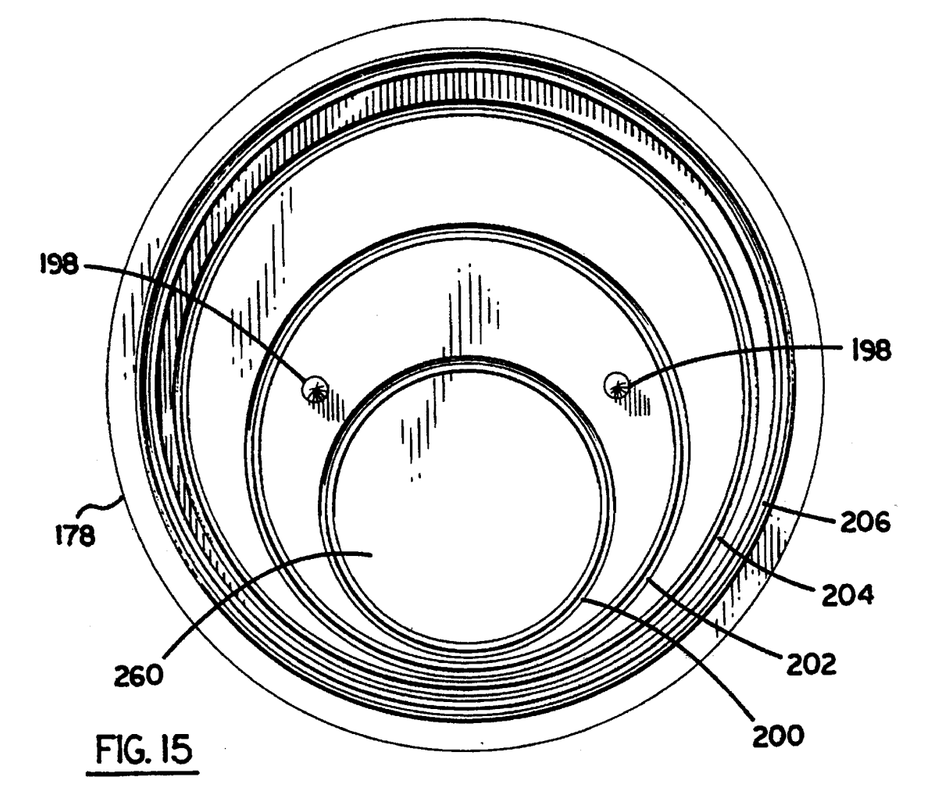
FIG. 15 is a front view of the seal of FIG. 14.

In a preferred embodiment, fastening is by means which provide a continuous annular bond between flange 186 and wall 108, such as a weld bond between backside 184 and outer side 124.

A preferred weld is a fusion bond of material of the flange and material of the wall. Preferably the fusion bond is made by spin welding. This provides a strong, watertight bond. It also melts only the interfaces of wall 108 and flange 186, which may be of dissimilar materials. Wall 108 and flange 186 adjacent to the actual melted interface surfaces are essentially as-molded in order to retain structural strength.

Figure 16:
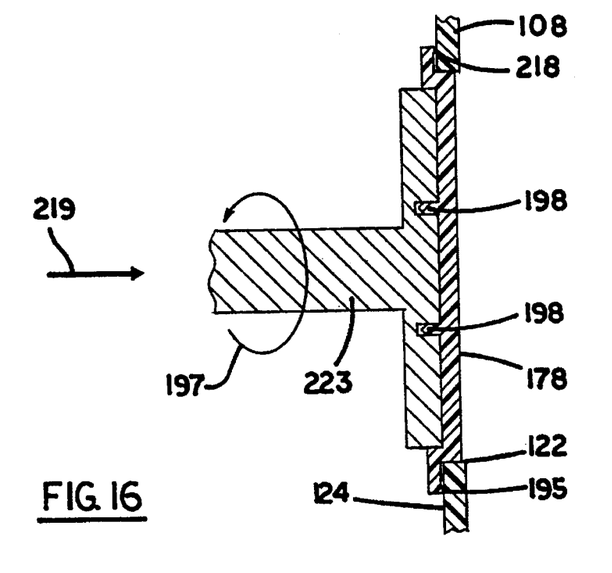
FIG. 16 is a cross section view of a seal being installed in a wall.

Referring additionally to FIG. 16, seal 178 is permanently installed in wall 108 by inserting the seal into opening 122 until annular bead 195 is in contact with outer side 124 of wall 108. Rotational force 197 is applied to the seal by way of drive pins 198 on the seal while the seal is pressed against wall 108 by arbor 223 in force direction 219.

Friction between bead 195 and outer side 124 melts the bead and the portion of the layer of side 124 that is in contact with the bead. After the melt is achieved, and while the materials of the two molten surfaces, are intermixing, the desired rotated position with respect to the bottom of the box of asymmetrical annular separation rings 200, 202, 204, and 206 is monitored, and rotation is stopped when the seal is at the desired position. This allows the plastic interfaces to harden and permanently sets the seal at the predetermined rotational angle.

The above process also sets the seal flange into wall 108. The depth of set 210, and the radial width 214 of the weld depends upon how much force is applied to the seal to force it against the wall, and the duration and speed of rotation.

Figure 17:
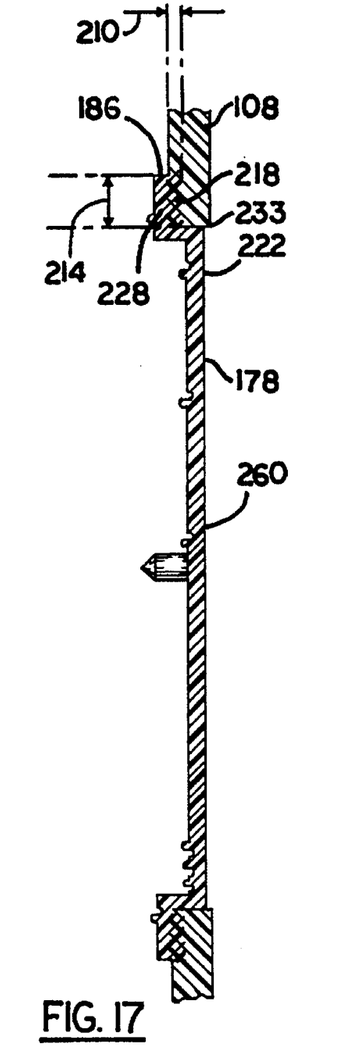
FIG. 17 is a cross section view of a seal installed in a box wall.

Referring to FIG. 17, the fusion bond between distribution box wall 108 and the seal body 222 extends over substantially the full width 214 of axial contact interface 218. The remaining portion 228 of the seal body adjacent to the interface, and the remaining portion 233 of the box adjacent to the interface is essentially as-molded The preferred fusion bond between flange 186 and wall 108 in which the remaining adjacent portions of the flange and wall are essentially as-molded may also be made by ultrasonic weld, or other means which provides that arrangement.

In another embodiment, the two surfaces are permanently fused by a chemical bonding agent which partially dissolves the materials of the flange and wall which mix together. The adjacent portions are essentially as-molded A fusible material may also be introduced between the bonded surfaces to provide a strong, watertight, weld.

Figure 18:
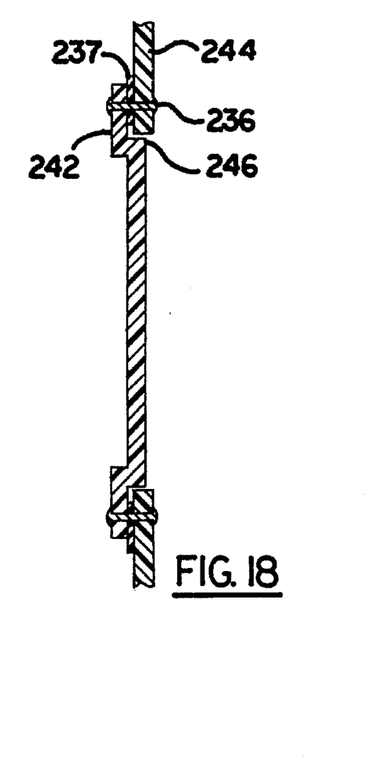
FIG. 18 is a cross section view of a seal installed in a box wall.

In another embodiment, in FIG. 18, a watertight, permanent, annular seal between flange 242 of seal 246 and wall 244 of a rain drain basin is provided by suitable fastening means such as rivets 236 clamping a gasket 237 between flange 242 and wall 244.

In another embodiment, external heat is applied, such as by laser or heat press to make the watertight, integral and permanent continuous annular bond between the flange and wall. The externally applied heat may change the remaining portion of the seal body and the box adjacent to the interface from what they were when as-molded, such as reduce their thickness, for example.

Returning to FIGS. 13, 14, 15, and 17, annular separation rings in wall 260 of seal 178, when pried apart such as with a screw driver, provide openings through seal wall 260 of different diameter for sealingly receiving pipes of different diameter through the seal. By this means, wall 260 is adjustable to accept any one from a predetermined variety of pipe diameters and pipe configurations between straight and corrugated.

For example, seal 178 has annular rings 200, 202, 206 and 204 at diameters respectively of 2,19", 3,21", 4,12", and 4.44", whereby removal of seal 178 wall 260 encompassed by ring 202 provides a closely fitting seal between wall 260 at ring 202 for 3" pipe through the seal. Removal of wall 260 encompassed by ring 204 provides a closely fitting seal between wall 260 at ring 204 for a 4" smooth pipe. Removal of wall 260 encompassed by ring 206 provides a closely fitting seal at ring 306 for 4" corrugated pipe. There is firm frictional engagement and low pressure sealing effective for an underground septic system distribution box, between the wall and the exterior peripheral surface of the pipe.

Seal 178 is preferably provided with seal wall 260 intact so that seal 178 closes and seals the opening in wall 108 unless it is desired to install a pipe through the seal.

Figure 19:
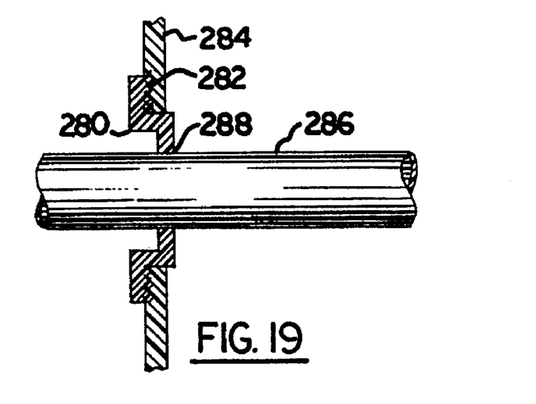
FIG. 19 is a cross section view of an installed seal holding a pipe.

In FIG. 19, seal 280 is bonded to septic tank wall 284, fused 282 by solvent melting of the interfaces of seal 280 and wall 284. The seal provides a single opening in the seal wall for receiving one size pipe 286. Seal contact line 288 with pipe 286 provides a watertight seal between seal 280 and pipe 286.

Figure 20:
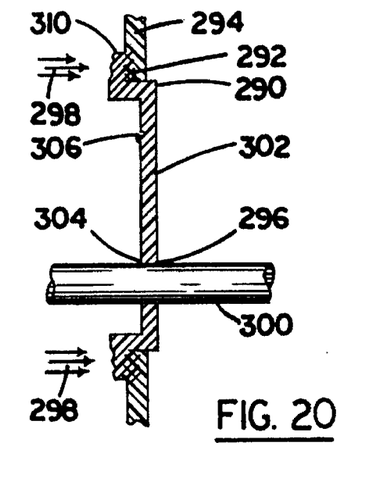
FIG. 20 is a cross section view of an installed seal holding a pipe.

In FIG. 20, seal 290 fused 292 in septic tank distribution box wall 294 by external heat from laser beam 298 on seal flange 310, provides two asymmetrical openings. The portion of flange 310 adjacent to fusion bond 292 interface layers of the flange and wall is no longer as-molded because it is melted and distorted by the laser beam.

Pipe 300 is sealed by seal wall 302 in opening 296 which was made by removing the seal wall within a weakened annular separation ring which now is the annular seal contact line 304 with pipe 300. Weakened annular separation ring 306 defines potential edges that seal with a pipe, of the second opening.

Figure 21:
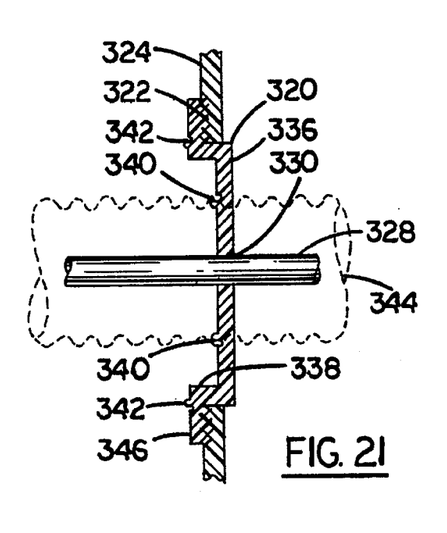
FIG. 21 is a cross section view of an installed seal holding a pipe, and a phantom view of an alternate pipe held by the seal.

Referring to FIGS. 21, and 16, seal 320, fused 322 in wall 324 receives smooth wall pipe 328 sealingly in opening 330 of planar seal wall 336. If seal wall 336 within the confine of annular separation ring 340 were removed, seal 320 would, instead of sealingly holding pipe 328, would sealingly hold larger diameter, corrugated, pipe 344. If planar seal wall 336 plus wall 338 which connects wall 336 to flange 346 within the confines of annular separation ring 342 were removed, seal 320 would sealingly hold Schedule 40 corrugated pipe 348 at seal contact 332 by a portion of flange 346.

Figure 22:
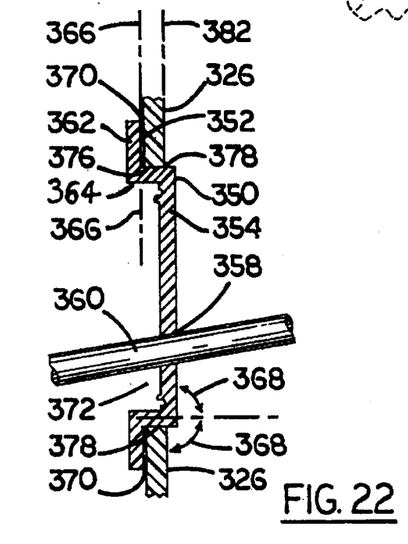
FIG. 22 is a cross section view of an installed seal holding a pipe.

In FIG. 22, seal 350, cemented 352 by epoxy, waterproof glue or other suitable means for cementing, on wall 356 in an integral, continuous, annular, permanent, bond, is sealed watertight 358 by seal wall 354 about smooth pipe 360 which is angled from the perpendicular to the plane 366 of bond interface 370.

Seal wall 354 transfers angular and twisting forces from the pipe to cylindrical wall 364 which is angled 368 normal (essentially 90 degrees) to planar wall 354 and to flange 362. The outward radial excursion of cylindrical wall 364 is limited by adjacent rim 376 of opening 372 in which seal 350 is mounted.

Cylindrical wall 364 has a generally constant diameter, and transfers to flange 362, axial components of the angular and twisting forces. This arrangement provides greater support for the seal in wall system, than if seal wall 354 is supported by a frustoconical wall, or a cylindrical wall that is spaced from rim 376 by substantially more than what is required for comfortable insertion of the seal in wall 356.

Wall 354 is juxtaposed with plane 382 of edge 378 in common with side 326 of wall 356, of rim 376. This arrangement transfers some torque forces toward edge 378, while rim 376 essentially prevents radial displacement of seal wall 354.

Figure 23:
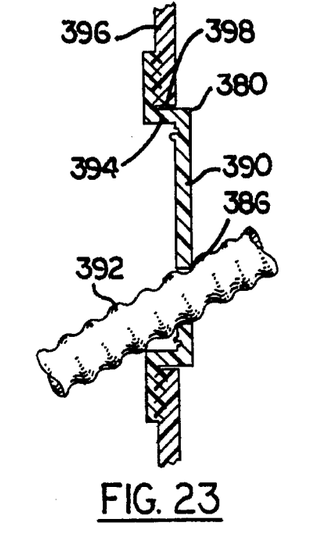
FIG. 23 is a cross section view of an installed seal holding a pipe.

In FIG. 23, asymmetrical seal 380 is sealed watertight 386 by seal wall 390 about corrugated pipe 392.

Seal wall 390 transfers angular and twisting forces from the pipe to cylindrical wall 394, the outward radial excursion of which is limited by rim 398 of plastic distribution box wall 396.

Figure 24:
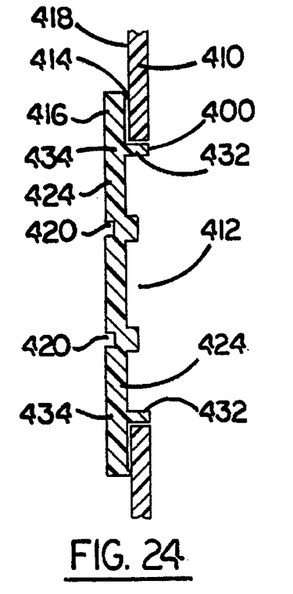
FIG. 24 is a cross section view of a seal installed in a box.

In FIG. 24, seal body 400 is permanently installed in wall 410 by inserting the seal into opening 412 until annular bead 414 on flange 416 is in contact with outer side 418 of wall 410. Rotational force is applied to seal body 400 by way of drive recesses 420 in planar seal wall 424 until the bead fuses with wall 420 as described earlier. Cylindrical wall 432 which surrounds and is continuously attached to the periphery 434 of planar seal wall 424 is also continuously attached to flange 416, and is normal to wall 424. Wall 432 is adjacent to wall 410 in opening 412.

Figure 25:
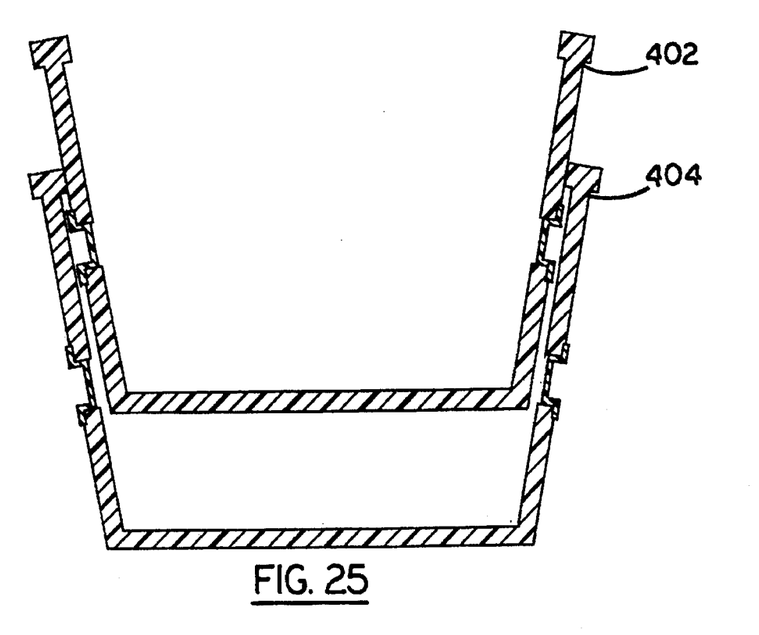
FIG. 25 is a cross section view of a pair of nested, septic system plastic distribution boxes with integrally fastened seals, according to the present invention.
Figure 26:
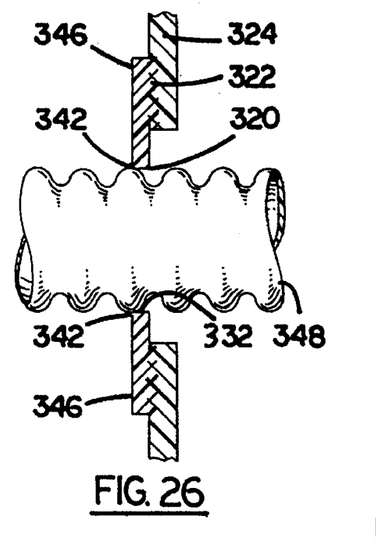
FIG. 26 is a cross section view of a seal installed in a box.

In FIG. 25, two septic system plastic distribution boxes with integrally fastened seals, 402, and 404, are fully nested for shipment to a customer, ready to use in a septic system which has a predetermined variety of sizes of smooth wall and corrugated pipes.

Figure 27:
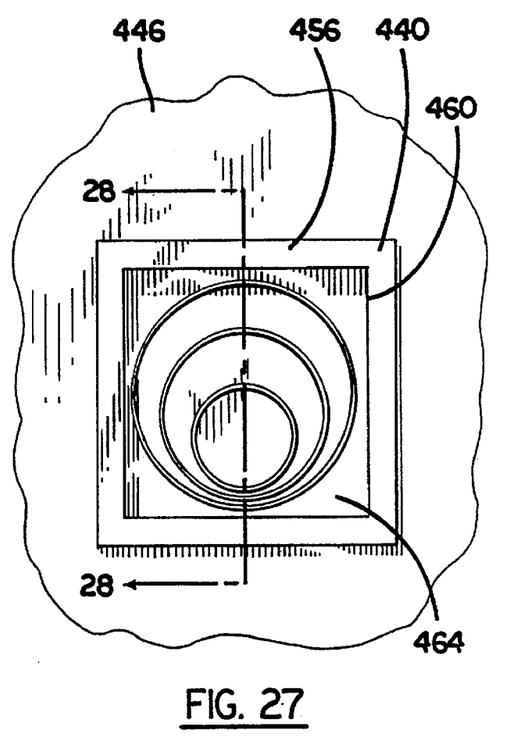
FIG. 27 is a front view of a seal installed in a box.
Figure 28:
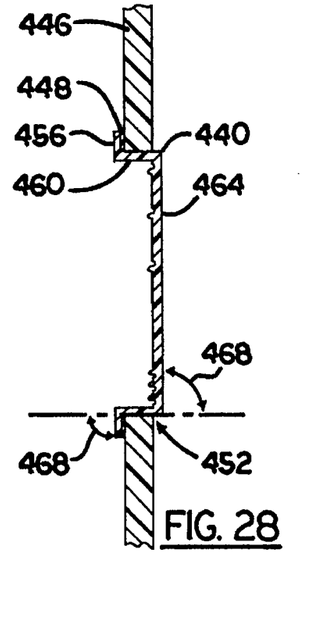
FIG. 28 is a cross section view of the seal of FIG. 27, as viewed at 28—28.

Referring to FIGS. 27, and 28, asymmetrical seal body 440 is attached to septic system plastic distribution box wall 446 by a continuous watertight bond 448 around square opening 452 in wall 446, between flange 456 and wall 446. Wall 460 which connects flange 456 with planar seal wall 464 is normal 468 to flange 156 and to seal wall 464.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

I claim:

1. A fluid distribution box adapted for subterranean burial, comprising:

a plastic container, being one piece circumferentially, and having a top, a bottom and comprising a first wall between said top and bottom, said first wall having an outer side and an inner side with respect to said plastic container, a first opening through said first wall formed by said first wall surrounding said opening in one continuous piece, a separately formed, plastic seal member comprising a cylindrical wall having a first end and a second end, said cylindrical wall comprising a second opening through said seal member from said first end to said second end for receiving a pipe through said seal member an annular flange on said cylindrical wall, extending generally radially outward from said cylindrical wall, said flange having a first side facing toward said first end of said cylindrical wall and having a second side facing toward said second end of said cylindrical wall, said cylindrical wall extending into said first opening, the first side of said flange being fastened in a continuous annular bond and continuous water tight seal to one of said outer side and said inner side of said first wall around said opening by a fusion bond, and the second side of said flange facing away from said first wall.

2. The distribution box of claim 1, further comprising:

an annular bead on said flange, extending axially on said first side of said flange, spaced from said cylindrical wall, and fused to said first wall around said first opening.

* * * * *